US012182202B2

(12) United States Patent
Rasmussen

(10) Patent No.: US 12,182,202 B2
(45) Date of Patent: Dec. 31, 2024

(54) SYSTEM, DEVICES AND/OR PROCESSES FOR UPDATING CALL GRAPHS

(71) Applicant: INSITRO, INC., South San Francisco, CA (US)

(72) Inventor: Matthew Rasmussen, San Francisco, CA (US)

(73) Assignee: Insitro, Inc., South San Francisco, CA (US)

( * ) Notice: Subject to any disclaimer, the term of this patent is extended or adjusted under 35 U.S.C. 154(b) by 19 days.

(21) Appl. No.: 17/484,962

(22) Filed: Sep. 24, 2021

(65) Prior Publication Data

US 2023/0115149 A1 Apr. 13, 2023

(51) Int. Cl.
*G06F 16/901* (2019.01)
*G06F 16/21* (2019.01)

(52) U.S. Cl.
CPC ........ *G06F 16/9024* (2019.01); *G06F 16/219* (2019.01); *G06F 16/9014* (2019.01)

(58) Field of Classification Search
CPC . G06F 16/9024; G06F 16/219; G06F 16/9014
USPC ......................................................... 707/798
See application file for complete search history.

(56) References Cited

U.S. PATENT DOCUMENTS

| | | | |
|---|---|---|---|
| 9,559,928 B1 * | 1/2017 | Porter ................. | G06F 11/3624 |
| 9,928,517 B1 * | 3/2018 | Hitchcock ........... | G06F 11/3466 |
| 10,042,746 B2 | 8/2018 | Rajanna et al. | |
| 10,423,445 B2 | 9/2019 | Mishra et al. | |
| 10,489,375 B1 * | 11/2019 | McClintock ............ | G06F 16/23 |
| 10,554,701 B1 * | 2/2020 | Decker .................. | G06F 21/55 |
| 10,719,431 B2 | 7/2020 | Peng et al. | |
| 10,871,950 B2 | 12/2020 | De Smet | |
| 11,184,269 B1 * | 11/2021 | Nee ...................... | H04L 43/0888 |
| 11,288,044 B1 * | 3/2022 | Abadi ........................ | G06F 8/75 |
| 2004/0220923 A1 * | 11/2004 | Nica ................. | G06F 16/24544 |
| 2009/0100410 A1 * | 4/2009 | Pouliot ..................... | G06F 8/75 717/122 |
| 2010/0100774 A1 * | 4/2010 | Ding ................... | G06F 11/3636 714/E11.029 |
| 2011/0145800 A1 * | 6/2011 | Rao ..................... | G06F 11/3636 717/133 |
| 2012/0060142 A1 * | 3/2012 | Fliess .................. | G06F 11/3457 717/102 |

(Continued)

FOREIGN PATENT DOCUMENTS

EP 1016988 A2 7/2000

OTHER PUBLICATIONS

Knupfer et al., IEEE, Proceedings of the 2005 International Conference on Parallel Processing (ICPP'05), 2005, all pages. (Year: 2005).*

(Continued)

*Primary Examiner* — Amy Ng
*Assistant Examiner* — Antonio J Caiado
(74) *Attorney, Agent, or Firm* — Berkeley Law & Technology Group, LLP

(57) ABSTRACT

Example methods, apparatuses, and/or articles of manufacture are disclosed that may be implemented, in whole or in part, using one or more computing devices to: compare first nodes of a first call graph to second nodes of a second call graph based, at least in part, on hash values associated with the first and second nodes to identify one or more of the second nodes that are absent from the first nodes.

22 Claims, 6 Drawing Sheets

(56) References Cited

U.S. PATENT DOCUMENTS

| | | | | |
|---|---|---|---|---|
| 2015/0120432 | A1* | 4/2015 | Wang | G06Q 30/0242 |
| | | | | 705/14.41 |
| 2015/0205590 | A1* | 7/2015 | Sabne | G06F 8/456 |
| | | | | 717/149 |
| 2017/0103210 | A1* | 4/2017 | Baji-Gál | G06F 21/52 |
| 2017/0103217 | A1* | 4/2017 | Arasu | H04L 9/0819 |
| 2018/0060216 | A1* | 3/2018 | Kasi | G06F 11/00 |
| 2018/0088936 | A1* | 3/2018 | Tanimoto | G06F 8/65 |
| 2018/0349374 | A1* | 12/2018 | Gurajada | G06F 16/2255 |
| 2019/0138428 | A1* | 5/2019 | Sumitomo | G06F 11/3616 |
| 2019/0306173 | A1* | 10/2019 | Reddy | G06F 11/3604 |
| 2019/0392396 | A1* | 12/2019 | Liu | G06F 16/90332 |
| 2020/0111022 | A1* | 4/2020 | Silberman | G06N 3/044 |
| 2020/0162236 | A1* | 5/2020 | Miller | G06F 40/174 |
| 2020/0201675 | A1 | 6/2020 | Li | |
| 2020/0350038 | A1 | 11/2020 | Van Rooyen et al. | |
| 2021/0012012 | A1* | 1/2021 | Soroush | H04L 63/1433 |
| 2021/0073284 | A1* | 3/2021 | Hunter | G06F 21/64 |
| 2021/0232377 | A1* | 7/2021 | Bae | G06F 21/577 |
| 2021/0232579 | A1* | 7/2021 | Schechter | G06F 9/3005 |
| 2021/0232695 | A1* | 7/2021 | Eldefrawy | G06F 21/602 |
| 2023/0229704 | A1* | 7/2023 | Wang | G06N 3/08 |
| | | | | 707/798 |

OTHER PUBLICATIONS

Grove et al. IBM T.J. Watson Research Center, A Framework for Call Graph Construction Algorithms, 2001, all pages. (Year: 2001).*

Hu et al. CCS'09, Nov. 9-13, 2009, Chicago, Illinois, USA, Large-Scale Malware Indexing Using Function-Call Graphs, 2009, all pages. (Year: 2009).*

Knupfer et al., Construction and compression of complete call graphs for post mortem program trace analysis. IEEE, Proceedings of the 2005 International Conference on Parallel Processing (ICPP'05), 2005, all pages. (Year: 2005 (Year: 2005).*

Notification of Transmittal of the International Search Report and the Written Opinion of the International Searching Authority, or the Declaration, App. No. PCT/US2022/076621, Mailed Dec. 9, 2022, 25 Pages.

Huber, et al., "AiiDA 1.0, a scalable computational infrastructure for automated reproducible workflows and data provenance," arXiv:2003.12476v1 [cs.DC], Mar. 24, 2020, 22 Pages.

Notification Concerning Transmittal of International Preliminary Report on Patentability, App. No. PCT/US2022/076621, Mailed, Apr. 4, 2024, 8 pages.

* cited by examiner

SYSTEM, DEVICES AND/OR PROCESSES FOR UPDATING CALL GRAPHS

BACKGROUND

1. Field

The present disclosure relates generally to call graphs.

2. Information

Use of call graphs have enabled efficient collaboration among contributors to computationally intensive projects. Such computationally intensive projects may include, for example, genomic analysis. In an implementation, a call graph may represent calling relationships between and/or among executed subroutine and/or called procedures.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
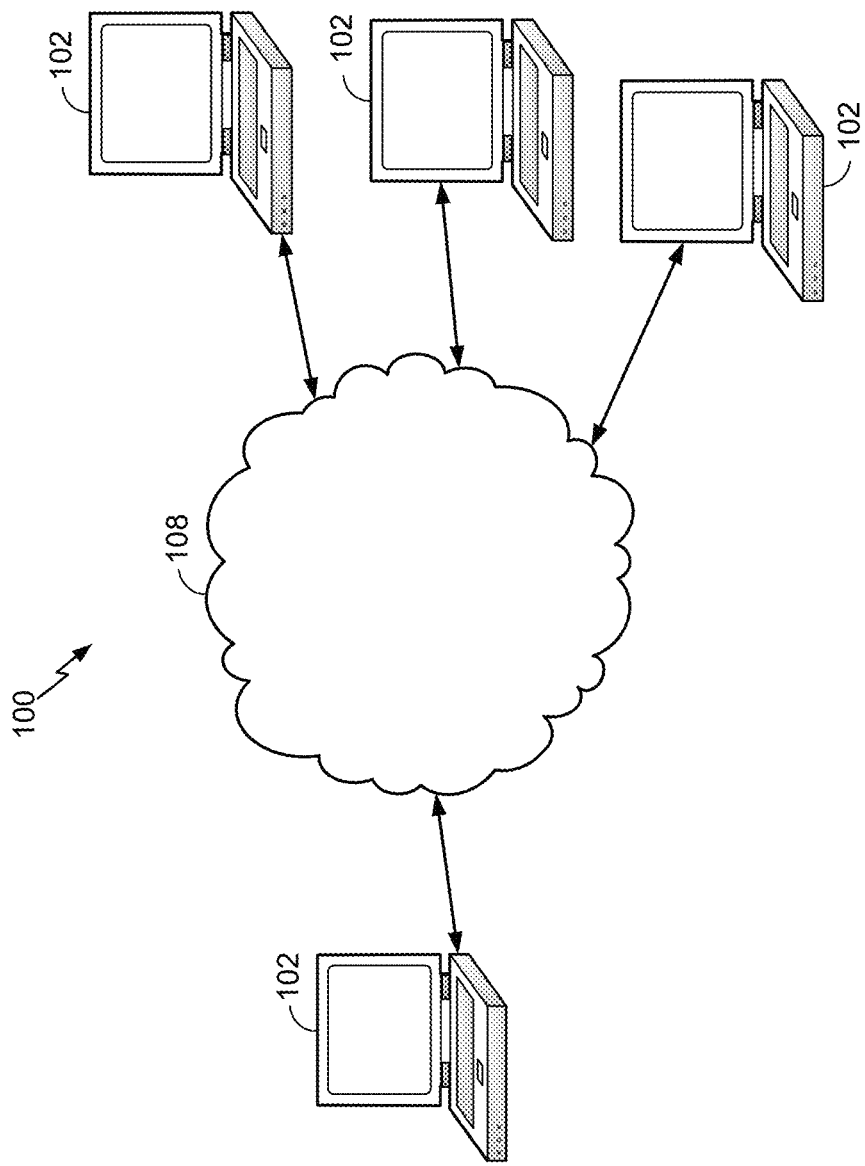
FIG. 1 is a schematic diagram of a computing environment, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, to assist in storage and/or retrieval of items stored in a physical memory, a computerized system may express features relating to such stored items in a graph including nodes representing objects and edges connecting such nodes to represent relationships between and/or among such objects. In this context, the term "graph" as used herein is to mean one or more signals and/or memory states expressing such objects and edges in an electronic document. According to an embodiment, one type of graph, a call graph, may be useful in representing calling relationships between and/or among executed subroutines and/or called procedures of a computing program.

A "call graph," as referred to herein, means a graph which represents calling relationships between and/or among executed subroutines and/or callable procedures in a particular invocation of execution of a computer program. For example, a node in a call graph may represent an executed subroutine and/or procedure while an edge (f, g) may indicate a procedure f calling a procedure g. In a particular implementation, a call graph may be acyclic to represent one or more recursive procedure calls. For example, multiple calls of a particular procedure may be represented by multiple associated nodes in a call graph. In an embodiment, a call graph may further represent and/or reference specific data sources for such an invoked execution sequence such as, for example, output values generated by a calling task in the execution sequence to be provided as input values for a called task in the invoked execution sequence. In a particular implementation, a node of a call graph may express and/or represent locators and/or pointers indicating locations in one or more databases maintaining objects, parameters, etc., that may be accessed, queried and/or searched to, for example, perform particular desired analysis.

While a call graph may provide a tool to facilitate coordination of workflows involving different organizations and/or teams, a call graph may be limited in its ability to express origins of datasets or versions of individual tasks that were executed in an invocation of a computing program execution sequence. As such, a call graph may be limited in its ability to enable efficient synchronization and merging of call graphs generated by multiple sources in complex workflows (e.g., for engineering and/or informatics teams). For example, changes in one portion/aspect of an execution sequence (e.g., changes to code and/or input data) may necessitate re-execution of larger portions of the executed sequence.

Briefly, one particular embodiment is directed to comparing first nodes of a first call graph to second nodes of a second call graph to identify one or more of the second nodes that are absent from the first nodes. In a particular implementation, such a comparison of first and second nodes may be based, at least in part, on hash values associated with the first and second nodes. Use of such comparison of hash values may enable a convenient, reliable and low-computation process to identify the second nodes that are absent from the first nodes. Second nodes identified as being absent from the first nodes may then be incorporated in the first call graph to achieve and/or maintain consistency between the first and second call graphs.

FIG. 1 is a schematic diagram of a computing environment 100, according to an embodiment of a workflow system to facilitate collaboration among multiple members of an organization and/or team. In a particular implementation, members of such an organization and/or team may collaborate over the course of multiple invocations of a computer program where such invocations may be expressed and/or represented, at least in part, as associated call graphs. In this context, an "invocation" of a computing program, as referred to herein, means execution of all or a portion of a computing program to transform a first state (e.g., expressed as one or more electronic documents) to a second state. Such a transformation of the first state to the second state may, for example, entail computations to execute one or more desired computing tasks. In a particular implementation, invocations of a computing program may be executed by one or more of computing devices 102, or other computing device (not shown). Alternatively, such a computing program may be executed in parts by multiple computing devices 102 in a distributed fashion. In a particular implementation, network 108 may comprise communication infrastructure to, for example, enable transmission and receipt of messages in a network between and/or among computing devices according to one or more message communication protocols. Such transmission and receipt of messages may, at least in part, enable collaborative invocation of a computing program by multiple computing devices 102 in a peer-to-peer fashion. For example, an invocation of a computing program may comprise execution of different portions of the computing program by different computing devices 102 in a "workflow," and results of execution of the different portions may be integrated/combined at one or more computing devices. In an alternative embodiment, network 108 may comprise one or more computing devices (not shown) to serve as a central server hub to centrally integrate computation results of an invocation of a computing program. It should be understood, however, that these are merely examples of how invocations of computing program may be created and/or integrated, and claimed subject matter is not limited in this respect.

According to an embodiment, network 108 may facilitate peer-to-peer collaboration between and/or among applications executing on computing devices 102. For example, network 108 may facilitate messaging between and/or among applications executing on computing devices 102 to implement aspects of updating and/or synchronizing call graphs expressing and/or representing invocations of a computing program. Alternatively, network 108 may comprise one more public cloud servers (e.g., Amazon Web Services) and/or one or more codebase hosting provider servers (e.g., GitHub) to host processes to update and/or synchronize such call graphs. Here, users may access such publicly hosted processes to update and/or synchronize such call graphs through a secure authorization process.

According to an embodiment, results from an invocation of a computing program may be stored locally on one or more of computing devices 102 in a local memory (e.g., non-volatile memory, not shown) and/or in memory storage devices accessible by public cloud service and/or codebase hosting provider servers (not shown). Such results from an invocation of a computing program may be expressed and/or represented in such a local memory and/or memory storage devices as a call graph, for example. In a particular implementation, an application hosted on a computing device 102 may query features of such a stored call graph to obtain parameters for use in off-line analysis, for example. In one implementation, a node of a call graph may include pointers and/or links to relevant parameters (e.g., input values, output values, source code, etc.) that are to be retrievable and/or searchable responsive to a query executed by a computing device 102.

According to an embodiment, multiple invocations of a computing program may be performed and/or integrated to provide and/or express different associated results. A particular invocation of a computing program may be premised on a particular state of assumptions, input values, applied algorithms, etc. In a particular example, one invocation of a particular computing program may be generated from execution by a first computing device of all or a portion of the particular computing program based on a current state of assumptions, input values, applied algorithms, etc. Another, different invocation of the particular computing program may be generated by a second computing device of all or a portion of the particular computing program based on a different (e.g., previous) state of assumptions, input values, applied algorithms, etc. Being based on different states of assumptions, invocations generated from the first and second computing devices by execution of the particular computing program (e.g., expressed and/or represented as call graphs stored locally on the first and second computing devices) may not be identical.

Figure 2A:
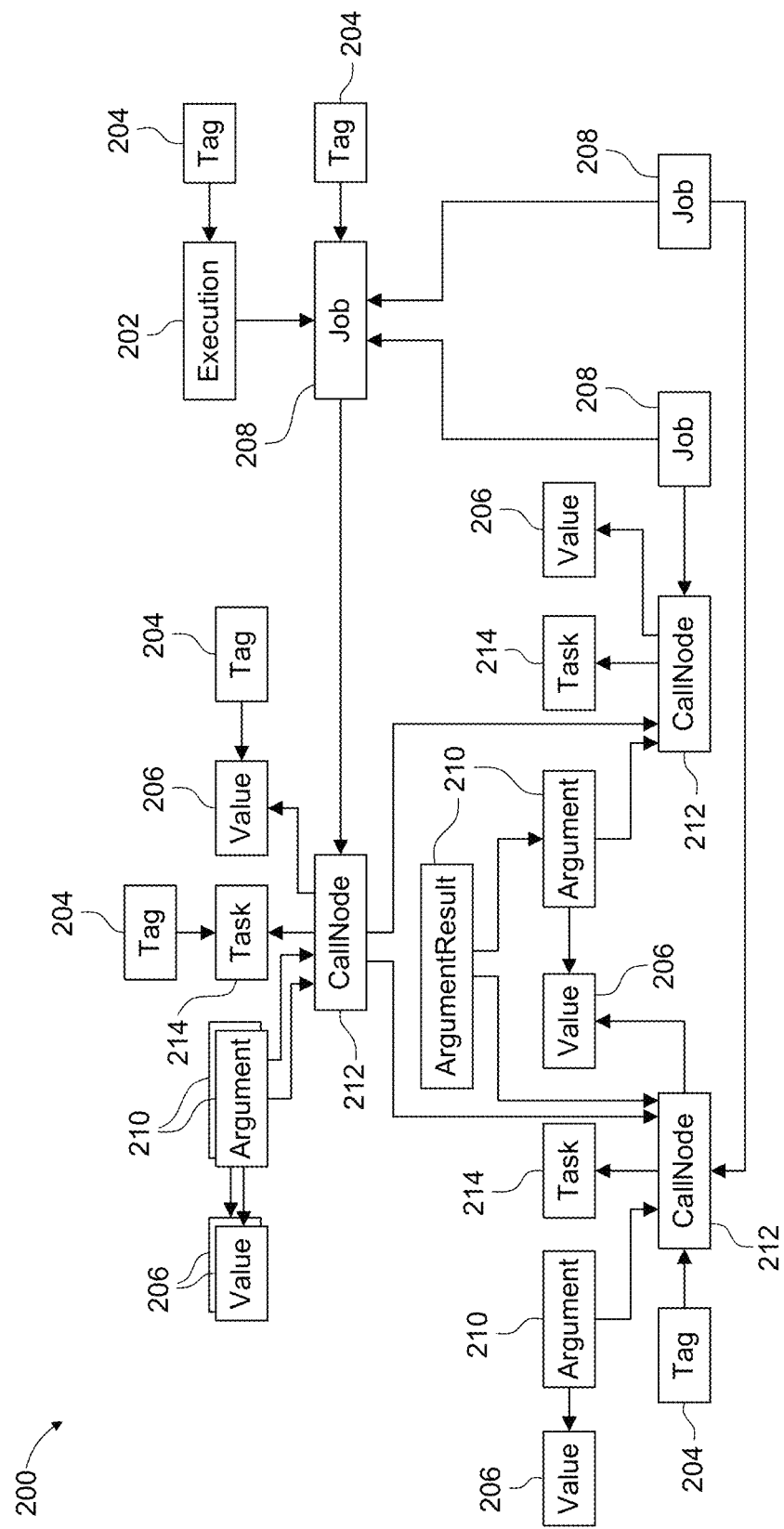
FIGS. 2A and 2B are schematic diagrams of call graphs, according to an embodiment.
Figure 2B:
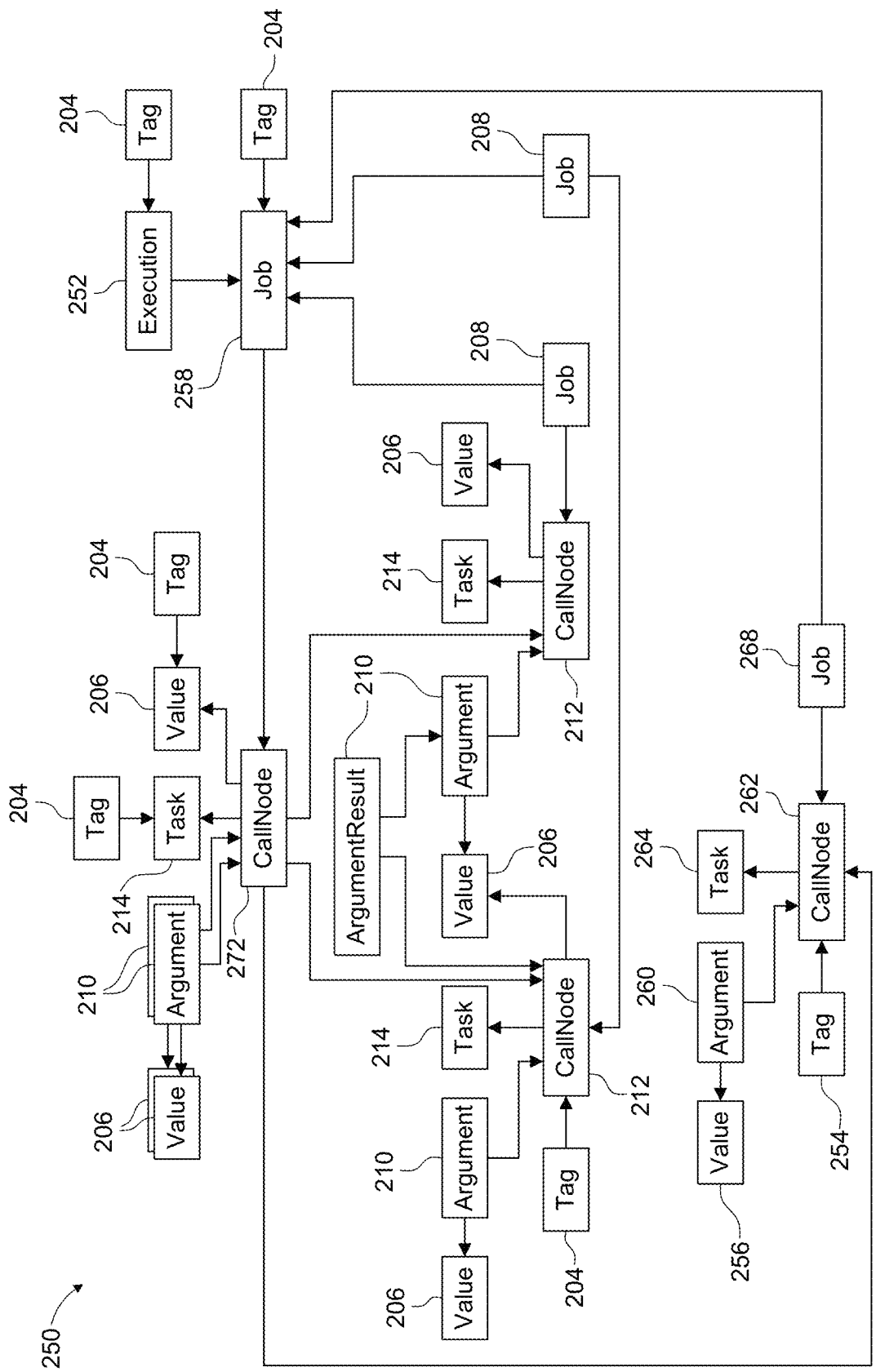

FIGS. 2A and 2B are schematic diagrams of call graphs to express different invocations of a computing program, according to an embodiment. In a particular implementation, call graph 200 may be stored locally at a first computing device (e.g., a computing device 102) while call graph 250 may be locally stored at a second, different, computing device. As pointed out above, a "graph" in the context of the present disclosure is to mean one or more signals and/or memory states expressing objects (e.g., as nodes) and edges relating such objects in an electronic document. In an implementation, features of call graphs 200 and 250 (e.g., nodes, edges connecting nodes and labels to be associated with nodes and/or edges) may be expressed and/or represented by values formatted in data structures maintained in electronic documents that are stored in computer memories, for example.

According to an embodiment, different types of nodes in call graph 200 or 250 may represent different features in invocations of a computing program. An execution node 202 may represent a single invocation of a workflow by a user or by an automated process, and may be uniquely identified by an associated universally unique identifier (UUID). In a particular implementation as described below, such UUIDs may be determined as hash values. Here, multiple invocations of a computing program may be associated with multiple associated UUIDs. According to an embodiment, a particular workflow of an invocation of a computing program may be implemented as a series of compute stages. A job node 208, 258 and/or 268 may express and/or represent a status of a corresponding compute stage. In an implementation, job nodes 208, 258 and/or 268 may, at least in part, form a tree to mimic an associated particular invocation of a portion of computing program. While a particular workflow may be implemented as a series of compute stages, each such compute stage may be expressed and/or represented by an associated job node 208, 258 and/or 268. For a task that is to be used for execution in an invocation of a computing program, a task node 214 or 264 may express and/or represent a particular version of such a task that was executed in the invocation of the computing program. A CallNode 212, 262 and/or 272 may express and/or represent a particular execution of a task associated with a task node 214 or 264, for example. In a particular implementation, a CallNode 212 or 262 may identify any child CallNodes 212 or 262. A value node 206 or 256 may represent and/or express a particular workflow dataset/parameter set which may range from primitive types (int, string) to large values (DataFrame, files, databases), for example.

According to an embodiment, nodes of call graphs 200 and 250 may be labeled with hash values to, for example, express additional features of an invoked execution sequence to facilitate peer-to-peer sharing of parameters (e.g., input, output and/or intermediate values) and/or code provenance, and synchronization and merging of call graphs generated by multiple sources. In this context, a "hash value" means a result of a cryptographic computation applied to one or more features associated with a node of a call graph to uniquely identify the node. In a particular implementation, such hash values applied as labels to nodes in a call graph may be recursively determine/defined, such as Merkle hash values. It should be understood, however, that this is merely an example of how hash values may be computed to be applied as labels in a graph, and different techniques may be used for computing hash values to be applied as labels in a graph. In one example, a task node 214 or 264 may be labeled with a hash of source code for an associated task and/or a hash of a specific version or manually assigned identifier. Likewise, a CallNode 212, 262 or 272 may be labeled with a hash tuple (Task.hash, hash (Arguments), hash (Result), CallNode.children.hashes)). Here, "Task.hash" may represent a hash of a unique identifier, "hash (Arguments)" may represent a hash of input values, "hash (Result)" may represent output values and "CallNode.children.hashes" may represent a hash of identifiers of subsequently called subroutines/modules. Similarly, a value node may be labeled with a hash of values represented by the value node.

As pointed out above, a value node 206 or 256 may express and/or represent any one of several types of data structures such as arrays, files, databases, etc. In a specific case of a value node 206 or 256 representing a simple array and/or finite-sized file, a hash label for such a value node 206 or 256 may be computed by a hash function applied to an entirety of the simple array and/or finite-sized file. In the case of a value node 206 or 256 representing a more complicated data structure such as a database, however, application of a hash function to an entirety of such a complicated data structure may be impractical. Thus, in a particular case in which a value node 206 or 256 is to represent and/or express a more complicated data structure such as a database, a hash label may be computed based on only a portion of such a more complicated data structure and/or metadata associated with/descriptive of the more complicated data structure. For example, a hash label for a value node 206 or 256 may be determined as an application of a hash function to a change/edit ledger associated with a database that is represented by the value node 206 or 256.

According to an embodiment, and as pointed out above, portions of a call graph (such as call graphs 200 and 250) in which nodes are labeled with hash values as discussed above may be queried to, for example, determine parameters regarding an origin of datasets (e.g., which particular upstream datasets were used in an execution of a particular task in an invocation of a computing program, or which versions of tasks/programs were used in such an execution). Hash labels may also facilitate maintaining peer-to-peer data provenance.

In one particular implementation, using hash values as node labels of a call graph may also simplify and/or facilitate incremental computing. In the example above, from hash values labels of a CallNode 212, 262 or 272, task nodes 214 or 264, and value nodes 206 or 256 may enable identification of specific input values, output values and/or specific computation operations used in an execution of one or more tasks in a workflow. If a re-execution is desired, for example, specific affected tasks in an execution sequence may be identified for execution while other tasks in the execution sequence not affected by such a change may be isolated. This may enable determination of specific tasks in the execution sequence to be re-executed for a particular recomputation, and avoidance of unnecessary re-execution of other tasks in the execution sequence.

According to an embodiment, a hash applied to a data structure may also reduce a need to store redundant images of files (e.g., to facilitate an incremental recomputation). In some workflow systems (e.g., Metaflow™, Flyte™, Reflow™, Nextflow™, DNAnexus™), a redundant copy of files may be maintained by such a workflow system to ensure rigorous correctness of files (e.g., for a possible recomputation) such that two images of a file may be stored, one image stored at a native memory location (e.g., accessible by multiple client computing devices) and a second image stored at a memory location dedicated to a workflow system. Such redundant copies incur memory/storage costs. By maintaining hashes of files/data structures (or portions thereof), single copies of such files/data structures may be stored in native locations that are accessible by workflow systems (e.g., for an incremental recomputation).

According to an embodiment, different invocations of a computing program may be expressed and/or represented by different corresponding call graphs. In one particular example, call graph 200 may express and/or represent features of a first invocation of a computing program and call graph 250 may express and/or represent features of a second invocation of the computing program. As may be observed from FIGS. 2A and 2B, job node 268, and nodes descending from job node 268, in call graph 250 are absent from call graph 200. This may occur, for example, if call graph 250 expresses and/or represents results of a most recent invocation of a computing program and call graph 200 expresses and/or represents results of a previous (e.g., outdated) invocation of the computing program. In a particular implementation, call graph 200 may be stored locally at a first computing device (e.g., a computing device 102) while call graph 250 may be locally stored at a second, different, computing device. Particular embodiments described herein are directed to synchronizing call graphs locally stored at different computing devices and expressing/representing different invocations of a computing program.

Figure 3A:
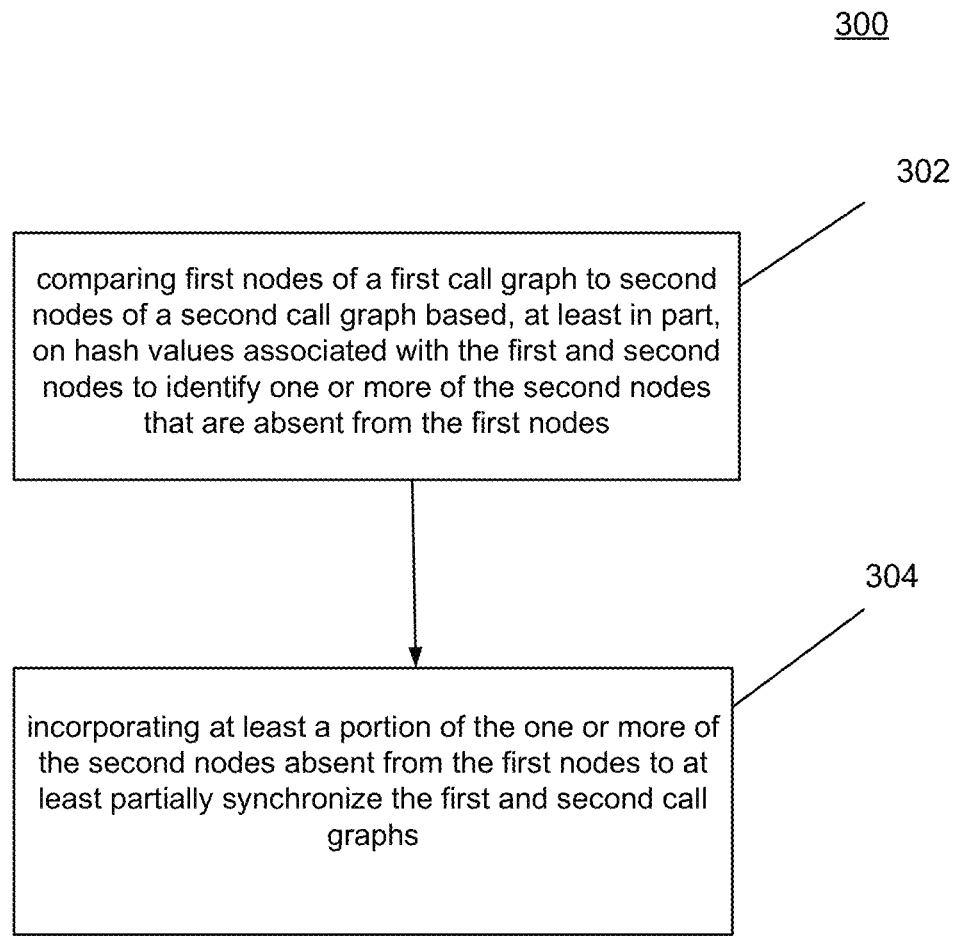
FIG. 3A is a flow diagram of a process of synchronizing features of call graphs expressing invocations of a computing program according to an embodiment.

FIG. 3A is a flow diagram of a process 300 of identifying differences between call graphs, according to an embodiment. Based, at least in part, on any identified differences, features of one call graph may be incorporated into another call graph to thereby synchronize the call graphs according to a common workflow. Block 302 may compare first nodes of a first call graph to second nodes of a second call graph based, at least in part, on unique hash values associated with the first and second nodes to identify one or more of the second nodes that are absent from the first nodes.

According to an embodiment, nodes of the first and second call graphs may be ordered according to a particular graph traversal scheme. For example, nodes of the first and second call graphs may be ordered according to an order of execution of tasks in an associated invocation of a computing program. In a particular implementation, hash values associated with second nodes of the second call graph may be maintained in a particular data structure such as a queue. For example, hash values associated with second nodes of the second call graph may be maintained in such a queue in a particular ordered sequence corresponding to an order of traversal of nodes in the second call graph. It should be understood, however, that a queue is merely an example data structure that may maintain hash values associated with nodes of a call graph, and claimed subject matter is not limited in this respect.

Figure 3B:
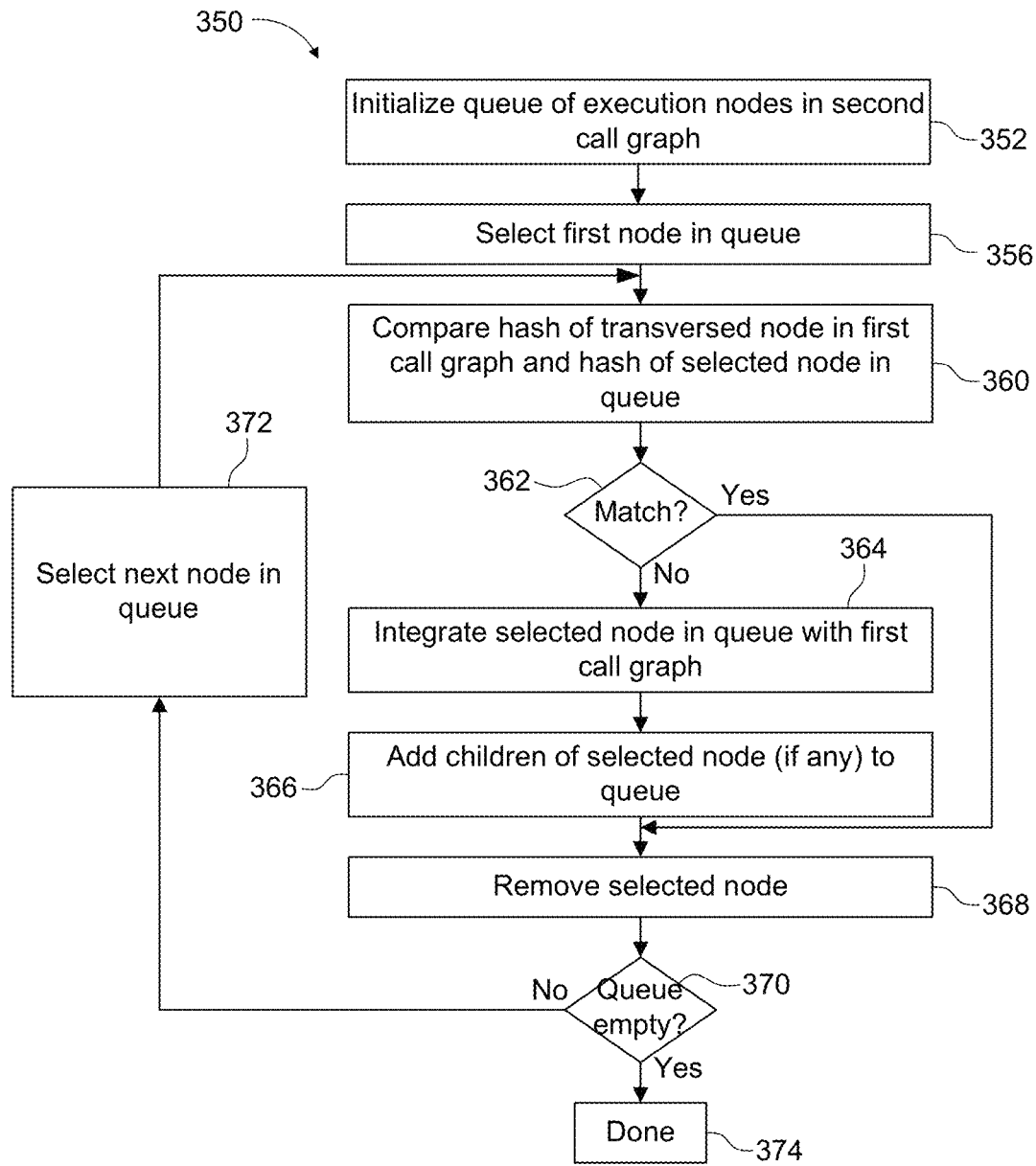
FIG. 3B is a flow diagram of a process of identifying one or more differences between call graphs, according to an embodiment.

According to an embodiment, and as referred to above, hash values associated with nodes in a call graph may provide UUIDs of such nodes in the call graph. In a particular implementation, block 302 may compare hash values in the queue with hash values of nodes in the first call graph to determine nodes in the second call graph that are absent from the first call graph. For example, call graph 250 comprises job node 268 that is absent from call graph 200. Conversely, first and second call graphs may comprise portions common to one another. For example, call graphs 200 and 250 may also have common subtrees containing CallNodes 212 that are grandchild nodes of job nodes 208 and 258, respectively. In a particular implementation, such a hash value-by-hash value comparison may be performed according to process 350 shown in FIG. 3B.

Block 352 may comprise initializing traversal of a first call graph (e.g., call graph 200, FIG. 2A) in order to identify nodes in the second call graph (e.g., call graph 250, FIG. 2B) that are not present in the first call graph. Consistent with such traversal of the first call graph, a queue data structure may be used to compare nodes in the first and second call graphs, and may be initialized with root nodes of the second call graph (e.g., execution node 252 in FIG. 2B). While the particular implementation of call graph 250 includes a single such root node as execution node 252, it should be understood that other implementations of such a second call graph may include two or more such root and/or execution nodes. For each execution node represented in a queue initialized at block 352, process 350 from block 356 through block 374 may identify descending nodes in a second call graph that are not present in a first call graph. According to an embodiment, a queue initialized at block 352 may order representations of nodes in a second call graph (e.g., hash values associated with such nodes in the second call graph) according to an order of traversal.

For a node in a traversed first call graph, blocks 360 through 374 may identify descending nodes of a node in the second call graph that is absent from the first call graph. Block 360 may compare the hash values of the call nodes in the first call graph with a hash value of a node in the second call graph that is currently selected from the queue. In an initial iteration of block 360 for a particular execution node traversed in a first call graph, an associated hash value may be compared with a hash value of a first node selected at block 356 (e.g., corresponding to an execution node in the second call graph). Here, block 360 and diamond 362 may determine whether the first node selected at block 356 matches the particular execution node in the first call graph. If the first node selected at block 356 matches the particular execution node in the first call graph, execution may be advanced to block 372 to select a subsequent node from the queue and traverse to a subsequent node in the first call graph (e.g., a child node of the particular execution node).

If it is determined at diamond 362 that a node selected from the queue at block 356 or 372 does not match any node in the first call graph, the node selected from the queue may be determined to be absent from the first call graph. Block 364 may then integrate into the first call graph the selected node determined to be absent from the first call graph, and block 366 may then place in the queue representations of nodes the second call graph (e.g., associated hash values) that are children of the selected node determined to be absent. According to an embodiment, block 366 may place such representations of child nodes in an order to match an order of traversal of corresponding nodes in the first call graph.

According to an embodiment, block 368 may remove a currently selected node from the queue and diamond 370 may terminate process 350 for a particular executive node in the first call graph if the queue is empty. Process 350 from block 356 through 374 may then repeat for any additional/subsequent execution nodes in the first call graph.

According to an embodiment, block 304 may incorporate in a first call graph at least some nodes in a second call graph that are determined to be absent from the first call graph to at least partially synchronize the first and second call graphs. In this context, to "synchronize" call graphs, as referred to herein, means a modification of one or more of the call graphs such that at least a portion common to the call graphs expresses and/or represents the same execution sequence for at least a portion of an invocation of a computing program. For example, the first call graph can be updated with the additional nodes present in the second call graph. In a particular implementation of a process to synchronize first and second call graphs as discussed above, nodes in a second call graph may be determined to be absent from the first call graph. In one example implementation, a node in a second call graph identified as being absent from the first call graph may correspond to a new procedure and/or result value present in a later invocation that did not occur in an invocation represented by the first call graph. Here, block 304 may add additional nodes in the second call graph (determined to be absent from the first call graph) to the first call graph to synchronize the two call graphs with the same information. In a particular implementation, block 304 may create a new edge in the first call graph to attach such an additional node in the second call graph. As illustrated in a particular implementation of call graph 200 being a first call graph and call graph 250 being a second call graph, such a new edge may be created to attach job node 268 (and nodes descending from job node 268) to the first call graph.

According to an embodiment, all or a portion of process 300 may be executed by computing device locally storing a first call graph that is to be updated in a "pull" implementation. Here, such a computing device may obtain a queue of hash values corresponding to nodes in a second call graph in one or more messages (e.g., in response to a request message). Alternatively, all or a portion of process 300 may be executed by a computing device that is to update a first call graph locally stored by another computing device in a "push" implementation. Here, a data structure of hash values identifying nodes in the locally stored call graph and a queue of hash values of nodes of a second call graph may be compared to identify nodes in the second call graph that are absent from the first call graph. Parameters defining nodes in the second call graph determined to be absent from the first call graph may be forwarded to the computing device hosting the first call graph. As may be observed, labeling nodes in a call graph with a hash value provides a technical solution (e.g., cannot be practically computed in the human mind) to determine whether a first call graph is lacking nodes of a second call graph that represents and/or expresses a most recent invocation of a computing program. In particular, a hash value by hash value comparison provides a technical solution to identifying specifically which nodes in the second call graph that are absent from the first call graph. This may enable and/or simplify a practical application to synchronize the first and second call graphs by incorporating in the first call graph nodes in the second call graph identified as being absent (based on a hash value by hash value comparison).

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "labels" (e.g., one or more labels), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, labels, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, labels, symbols, bits, elements, characters, numbers, numerals or measurements, relevant to digital content, such as digital content comprising a technical article, as an example, may include one or more authors, for example.

Claimed subject matter is intended to embrace meaningful, descriptive parameters, values, labels, symbols, bits, elements, characters, numbers, numerals or measurements in any format, so long as the one or more parameters, values, labels, symbols, bits, elements, characters, numbers, numerals or measurements comprise physical signals and/or states, which may include, as parameter, value, label, symbol, bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 4:
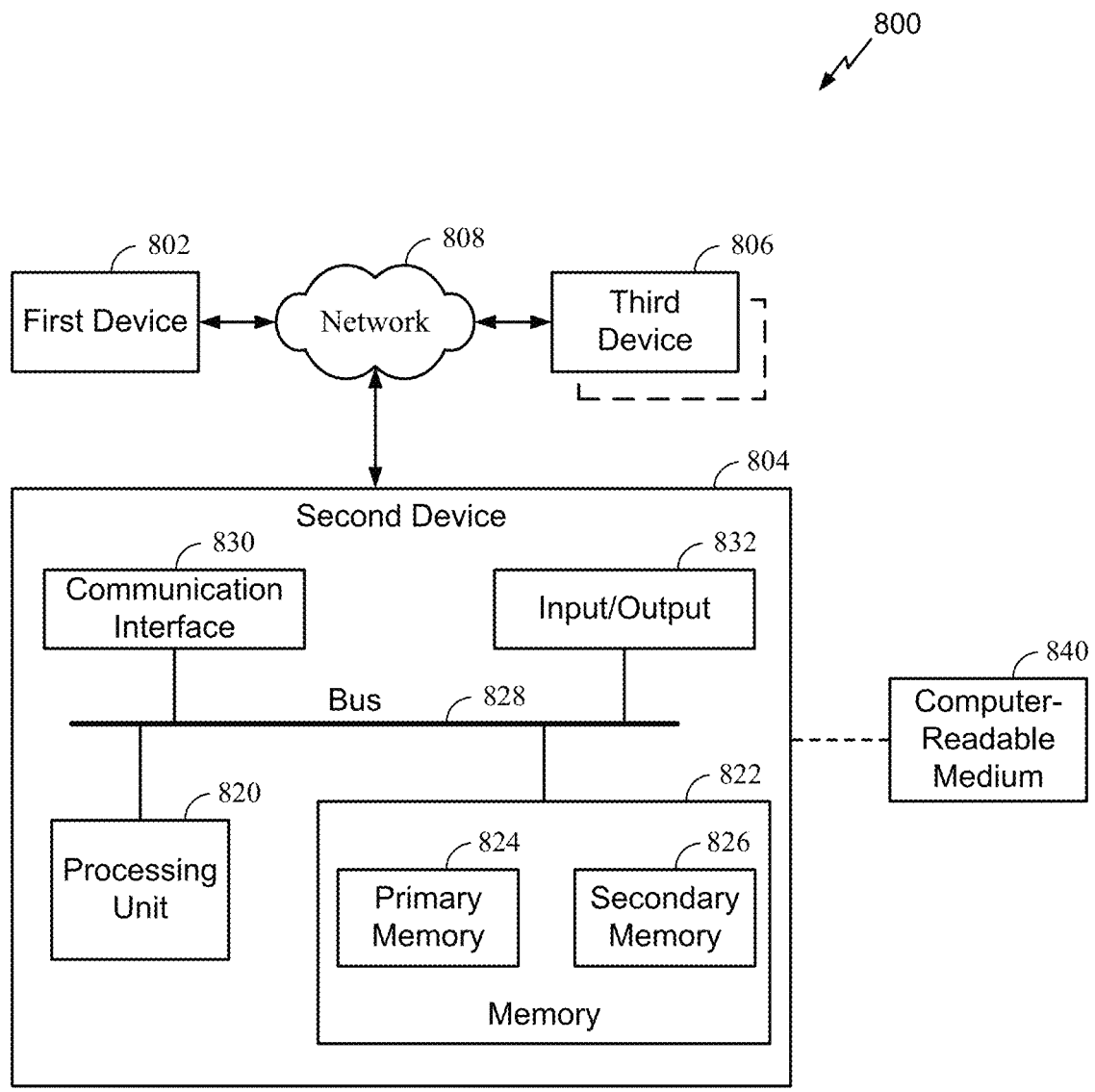
FIG. 4 is a schematic block diagram of an example computing system in accordance with an implementation.

In one example embodiment, as shown in FIG. 4, a system embodiment may comprise a local network (e.g., device 804 and medium 840) and/or another type of network, such as a computing and/or communications network. For purposes of illustration, therefore, FIG. 4 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 4 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 2A, 2B, 3A and 3B, and in the text associated with the foregoing figure(s) of the present patent application.

Referring now to FIG. 4, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 4, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 4, is merely one example, and claimed subject matter is not limited in scope to this particular example. FIG. 4 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 4, computing device 802 may provide one or more sources of executable computer instructions in the form of physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 4 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples. In particular implementations, one or more computing devices 102 (FIG. 1) may comprise at least some features of second computing device 804.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted that an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 4, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 4 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computer-implemented method comprising, at a processor:
   fetching executable instructions; and
   executing the fetched executable instructions to:
      compare first signals and states stored in a memory expressing computed cryptographic hash values labeling a first plurality of nodes of a first call graph, the first call graph expressing features of a first previously executed invocation of a computing program, to second signals and states stored in the memory expressing computed cryptographic hash values labeling a second plurality of nodes of a second call graph, the second call graph expressing features of a second previously executed invocation of the computing program, the first signals and states stored in the memory expressing cryptographic hash values comprising a computed cryptographic hash of source code for one or more tasks executed in the first previously executed invocation, of an identifier of the source code, of one or more arguments of the one or more tasks executed in the first previously executed invocation or of one or more results of the one or more tasks executed in the first previously executed invocation, or a combination thereof; and
   incorporate at least a portion of the second plurality of nodes of the second call graph into the first call graph based, at least in part, on comparison of the first signals and states stored in the memory expressing computed cryptographic hash values to the second signals and states stored in the memory expressing computed cryptographic hash values to at least partially synchronize the first and second call graphs, the incorporated at least a portion of the second plurality of nodes to express or represent locators or pointers to thereby enable access to results of the second previously executed invocation via the first call graph.

2. The method of claim 1, wherein incorporation of the at least a portion of the at least one of the one or more of the second plurality of nodes absent from the first plurality of nodes to at least partially synchronize the first and second call graphs further comprises:
   execution of the fetched executable instructions to append at least one of the second plurality of nodes absent from the first plurality of nodes to the first call graph.

3. The method of claim 1, and further comprising executing the fetched executable instructions to:
   maintain hash values of labels of the second plurality of nodes in a queue; and
   remove a hash value of at least one of the second plurality of nodes from the queue responsive to detection of a presence of the at least one of the second plurality of nodes from among the first plurality of nodes.

4. The method of claim 3, and further comprising executing the fetched executable instructions to:
   append to the first call graph one or more of the second plurality of nodes associated with hash values remaining in the queue.

5. The method of claim 1, wherein the first signals and states stored in the memory expressing computed cryptographic hash values uniquely identifies at least one data source or executed code associated with the first previously executed invocation of the computing program.

6. The method of claim 5, wherein the at least one data source comprises one or more data files, and wherein the at least one of the computed cryptographic hash values expressed by the first signals and states stored in the memory is computed based, at least in part, on application of a hash function to contents of at least one of the data files.

7. The method of claim 5, wherein the at least one data source comprises one or more databases, and wherein the at least one of the computed cryptographic hash values expressed by the first signals and states stored in the memory is computed based on application of a hash function to an edit or change ledger of at least one of the one or more databases.

8. The method of claim 1, wherein the method further comprises executing the fetched executable instructions to:

determine a subset of execution stages for a recomputation of at least a portion of an execution sequence of the first previously executed invocation of the computing program based, at least in part, on the comparison of the first signals and states stored in the memory expressing the computed cryptographic hash values to the second signals and states stored in the memory expressing computed cryptographic hash values.

9. The method of claim 1, and further comprising executing the fetched executable instructions to:
store a single image for at least one data file to be accessible by a workflow system and at least one other entity in an enterprise,
wherein at least one of the computed cryptographic hash values expressed by the first signals and states stored in the memory uniquely identifies a version.

10. A computing device comprising:
a non-transitory memory storage device; and
one or more processors coupled to the non-transitory memory storage device to:
fetch executable instructions; and
execute the fetched executable instructions to:
compare first signals and states stored in the non-transitory memory storage device expressing computed cryptographic hash values labeling a first plurality of nodes of a first call graph, the first call graph to express features of a first previously executed invocation of a computing program, to second signals and states stored in the non-transitory memory storage device expressing computed cryptographic hash values stored in the non-transitory memory storage device labeling a second plurality of nodes of a second call graph, the second call graph to express features of a second previously executed invocation of the computing program, at least one of the computed cryptographic hash values expressed by the first signals and states stored in the non-transitory memory storage device comprising a computed cryptographic hash of source code for one or more tasks executed in the first previously executed invocation, of an identifier of the source code, of one or more arguments of the one or more tasks executed in the first previously executed invocation or of one or more results of the one or more tasks executed in the first previously executed invocation, or a combination thereof; and
incorporate at least a portion of the second plurality of nodes of the second call graph into the first call graph based, at least in part, on the comparison of the first signals and states stored in the non-transitory memory storage device expressing computed cryptographic hash values to the second signals and states stored in the non-transitory memory storage device expressing computed cryptographic hash values to at least partially synchronize the first and second call graphs, the incorporated at least a portion of the second plurality of nodes to express or represent locators or pointers to thereby enable access to results of the second previously executed invocation via the first call graph.

11. The computing device of claim 10, wherein the one or more processors are further to append at least one of the one or more of the second plurality of nodes absent from the first plurality of nodes to the first call graph to incorporate the at least a portion of the at least one of the second plurality of nodes absent from the first plurality of nodes to at least partially synchronize the first and second call graphs.

12. The computing device of claim 10, wherein at least one of the computed cryptographic hash values expressed by the first signals and states stored in the non-transitory memory storage device to uniquely identify at least one data source or executed code associated with the first previously executed invocation of the computing program.

13. The computing device of claim 12, wherein the at least one data source to comprise one or more data files, and wherein the at least one of the computed cryptographic hash values expressed by the first signals and states stored in the non-transitory memory storage device is computed based, at least in part, on application of a hash function to contents of at least one of the data files.

14. The computing device of claim 12, wherein the at least one data source to comprise one or more databases, and wherein the at least one of the computed cryptographic hash values expressed by the first signals and states stored in the non-transitory memory storage device to be computed based on application of a hash function to an edit or change ledger of at least one of the one or more databases.

15. The computing device of claim 10, wherein the one or more processors are further to:
determine a subset of execution stages for a recomputation of at least a portion of an execution sequence of the first previously executed invocation of the computing program based, at least in part, on the comparison of the first signals and states stored in the non-transitory memory storage device expressing computed cryptographic hash values to the second signals and states stored in the non-transitory memory storage device expressing computed cryptographic hash values.

16. An article comprising:
a non-transitory storage medium comprising computer-readable instructions stored thereon which are executable by one or more processors of a computing device to:
compare first signals and states stored in a memory expressing computed cryptographic hash values labeling a first plurality of nodes of a first call graph, the first call graph to express features of a first previously executed invocation of a computing program, to second signals and states stored in the memory expressing computed cryptographic hash values labeling a second plurality of nodes of a second call graph, the second call graph to express features of a second previously executed invocation of the computing program, at least one of the computed cryptographic hash values expressed by the first signals and states stored in the memory comprising a computed cryptographic hash of source code for one or more tasks executed in the first previously executed invocation, of an identifier of the source code, of one or more arguments of the one or more tasks executed in the first previously executed invocation or of one or more results of the one or more tasks executed in the first previously executed invocation, or a combination thereof; and
incorporate at least a portion of the second plurality of nodes of the second call graph into the first call graph based, at least in part, on comparison of the first signals and states stored in the memory expressing computed cryptographic hash values to the second signals and states stored in the memory expressing computed cryptographic hash values to at least partially synchronize the first and second call graphs, the incorporated at least a portion of the second plurality of nodes to express or represent locators or pointers to thereby enable access to results of the second previously executed invocation via the first call graph.

17. The article of claim 16, wherein the instructions are further executable by the one or more processors to:
append at least one of the one or more of the second plurality of nodes absent from the first plurality of nodes to the first call graph to incorporate the at least a portion of the at least one of the second plurality of nodes absent from the first plurality of nodes to at least partially synchronize the first and second call graphs.

18. The article of claim 16, at least one of the computed cryptographic hash values expressed by the first signals and states stored in the memory uniquely identifies at least one data source or executed code associated with the first previously executed invocation of the computing program.

19. The article of claim 18, wherein the at least one data source comprises one or more data files, and wherein the at least one of the cryptographic hash values expressed by the first signals and states stored in the memory to be computed based, at least in part, on application of a hash function to contents of at least one of the data files.

20. The article of claim 16, wherein the instructions are further executable by the one or more processors to:
determine a subset of execution stages for a recomputation of at least a portion of an execution sequence of the first previously executed invocation of the computing program based, at least in part, on the comparison of the first signals and states stored in the memory expressing computed cryptographic hash values to the second signals and states stored in the memory expressing computed cryptographic hash values.

21. The method of claim 1, wherein the features of the second previously executed invocation of the computing program comprise source code, input values or output values of a task executed in the second previously executed invocation of the computing program, or a combination thereof.

22. The method of claim 1, wherein:
the first call graph is stored locally at a first computing device and the second call graph is stored locally at a second computing device; and
the portion of the second plurality of nodes incorporated into the first call graph enables access to results of the second previously executed invocation of the computing program via the first computing device.

* * * * *